United States Patent [19]

Saito

[11] Patent Number: 4,630,751
[45] Date of Patent: Dec. 23, 1986

[54] CLOSURE MECHANISM

[75] Inventor: Asao Saito, Tokorozawa, Japan

[73] Assignee: Citizen Watch Co., Ltd., Tokyo, Japan

[21] Appl. No.: 841,550

[22] Filed: Mar. 20, 1986

[30] Foreign Application Priority Data

Mar. 25, 1985 [JP] Japan .............................. 60-42472[U]

[51] Int. Cl.$^4$ ....................... B65D 43/14; B65D 51/04
[52] U.S. Cl. .................................................... 220/334
[58] Field of Search ................ 220/334, 337; 206/387

[56] References Cited

U.S. PATENT DOCUMENTS

| | | | |
|---|---|---|---|
| 4,485,990 | 12/1984 | Ogiro et al. | 220/334 |
| 4,527,691 | 7/1985 | Pertzsch et al. | 206/387 |
| 4,546,898 | 10/1985 | Ekvan | 220/337 |
| 4,556,153 | 12/1985 | Takagi et al. | 220/334 |

Primary Examiner—George T. Hall
Attorney, Agent, or Firm—Kod and Androlia

[57] ABSTRACT

The present invention provides a closure mechanism applied to a cartridge inserting opening in a floppy disk drive or the like and including a lid member rotatably supported on a panel having an opening through which a cartridge or the like can be inserted into the floppy disk drive, the lid member biased toward its closed position under the action of a biasing spring which is rigidly mounted at one end on the panel with the opposite free end being engaged by the lid member under a biasing pressure such that the biasing force on the lid member can be maintained substantially constant by slidably moving the free end of the biasing spring on the surface of the lid member when the lid member is being opened.

4 Claims, 6 Drawing Figures

CLOSURE MECHANISM

BACKGROUND OF THE INVENTION

1. Field of the Invention:

The present invention relates to an improved closure mechanism in which a lid member is biased toward its closed position under the action of a biasing spring.

2. Description of the Prior Art:

Various types of electrical instruments and boxes include a closure structure comprising a lid member which is springly biased toward its closed position to prevent external dusts or other external matters from entering into the interior of each of the electrical instruments and boxes. In such a closure structure, the lid member is openable only when a preselected object is to be received. Such a closure structure is currently applied to the inlet opening of a floppy disk drive into which a floppy disk or disk cartridge is to be inserted or the inlet opening of a tape recorder, video recorder or CD device in which a cassette or disk is to be received.

Normally, the lid member is rotatably journalled on the backface of a panel and resiliently biased toward its closed position under the influence of spring means such as a leaf spring or the like. When it is wanted to insert a cartridge, cassette or disk into the interior of the device, the lid member can be forced to move inwardly so that the recording or recorded medium such as cartridge, cassette or disk will properly be inserted into the device or be removed therefrom.

In the prior art, however, the biasing spring is normally attached at one end to the backface of the panel with the opposite end thereof being hooked on a preselected point of action in the lid member. As the angle of the opened lid increases, therefore, the force of the biasing spring is increased so that the lid itself or the medium being inserted will be subjected to an excessive force when the medium is being inserted into the device. This may adversely influence the delicate recording or recorded medium. In other words, the recording or recorded medium may rapidly be degraded in service life since it is frequently used.

On the other hand, the biasing spring must properly be selected with respect to its spring constant and other performances such that the critical stress thereof will not be exceeded when said angle of the opened lid is increased. To properly design the biasing spring, however, the size of the biasing spring cannot help increasing. Thus, the leaf spring should undesirably be replaced by more expensive spring means such as coil spring or the like.

SUMMARY OF THE INVENTION

It is therefore an object of the present invention to provide an improved closure mechanism which can provide a substantially uniform biasing force for the lid member irrespective of the increasing angle of the opened lid member by the use of a very simple structure.

To accomplish the above object, the closure mechanism constructed in accordance with the present invention comprises a lid member and a biasing spring having one end journalled on a panel with the opposite end thereof being slidably engaged by the lid member at a predetermined point of action, whereby as the angle of the lid member being opened increases, the distance between said point of action and the pivot point of the lid member can be decreased to provide a substantially uniform or constant biasing force from the biasing spring.

Figure 1:
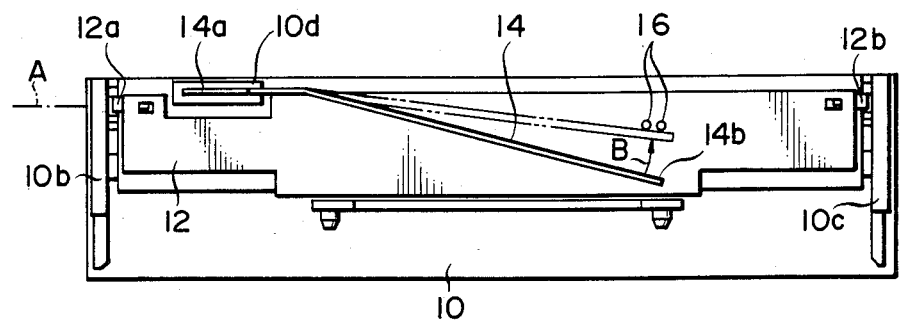
FIG. 1 is a back view of a closure mechanism constructed in accordance with the present invention, which is applied to a front panel in a floppy disk drive.
Figure 2:
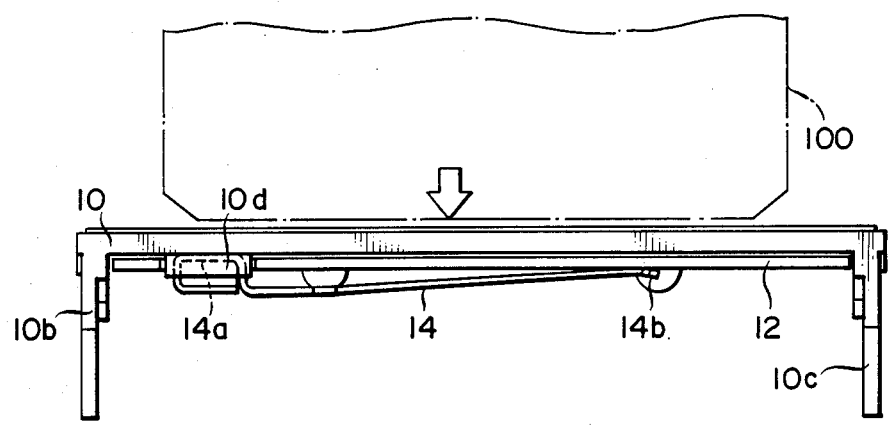
FIG. 2 is a plan view of the closure mechanism shown in FIG. 1.
Figure 3:
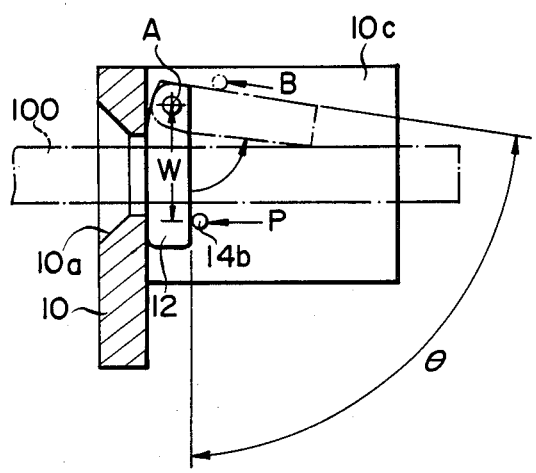
FIG. 3 is a schematic and fragmentary view illustrating the function of the closure mechanism shown in FIG. 1 in such a state that a cartridge is being inserted therethrough.

DETAILED DESCRIPTION OF PREFERRED EMBODIMENTS:

Referring now to FIGS. 1, 2 and 3, there is shown a preferred embodiment of a closure mechanism according to the present invention which is applied to a decorative front panel 10 in a floppy disk drive. The front panel 10 includes an opening 10a formed therein through which a floppy disk cartridge 100 can be inserted into or removed from the floppy disk drive. The front panel 10 also includes a pair of arm portions 10b and 10c each laterally extending from each end of the panel 10. These arm portions 10b and 10c are used to rigidly mount the front panel 10 on a stationary machine frame (not shown).

The front panel 10 pivotally supports a lid member 12 having a pair of stub shafts 12a and 12b which are formed on the lid member at the opposite ends and disposed on a common pivot axis A. Each of the stub shafts 12a and 12b is journalled on the front panel 10 at the backside thereof. The size of the lid member 12 is sufficient to completely close the opening 10a in the front panel 10. In FIGS. 1 to 3, the opening 10a is shown in its closed state by solid line.

A biasing spring 14 is rigidly attached at one end to the front panel 10. More particularly, the front panel 10 includes a receiving element 10d rearwardly extending from the backside of the front panel 10, the receiving element 10d adapted to rigidly receive one rectangular-shaped bent end 14a of the biasing spring 14 which is preferably made of a spring wire.

More particularly, the receiving element 10d on the front panel 10 includes a small groove having its width slightly smaller than the diameter of the biasing spring 14. When the rectangular-shaped bent end 14a of the biasing spring 14 is pressfitted into the groove in the receiving element 10d, the biasing spring 14 can firmly be held on the backside of the front panel 10 without need for any other fastening means.

The rectangular configuration of the bent end 14a of the biasing spring 14 can positively prevent the spring 14 from being twisted at the receiving element 10d even if the biasing spring 14 is made of a spring wire.

The opposite end 14b of the biasing spring 14 engages the surface of the lid member 12 under a predetermined biasing pressure. As seen from FIG. 2, the opposite end 14b of the biasing spring 14 is slightly bent such that the surface of the lid member 12 will not be damaged by engagement of the tip of the biasing spring therewith.

As seen from FIG. 1, the biasing spring 14 extends slantingly downwardly from its fastened end 14a across the lid member 12 and resiliently acts to urge the lid member 12 against the backside of the front panel 10 as shown by solid line in FIG. 1. Thus, the opening 10a in the front panel 10 can positively be closed by the lid member 12 to prevent any external dust and matters from entering into the floppy disk drive through the opening 10a.

The important feature of the present invention resides in the fact that said opposite end 14b of the biasing spring 14, that is, the point of action against the lid member 12 can slidably moved on the surface of the lid member 12 to change the distance between the point of action and the pivot axis A, depending on variations of the angle of the lid member 12 being opened.

The present invention will now be described in more details with respect to the opening operation of the lid member 12 when the cartridge 100 is being inserted into the floppy disk drive.

As shown in FIG. 2, the cartridge 100 is inserted into the drive from the front side of the front panel 10 through the opening 10a therein. At this point, the lid member 12 is forced to move rearwardly by the cartridge 100 being inserted to gradually increase the opening angle $\theta$ of the lid member 12, as shown in FIG. 3. Biasing force on the lid member 12 is shown by P in FIG. 3. Further, the distance between the pivotal axis A on the lid member and the point of action is shown by W in FIG. 3.

Figure 4:
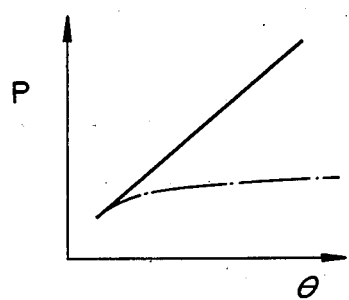
FIGS. 4 and 5 show characteristics of the closure mechanism according to the present invention.
Figure 5:
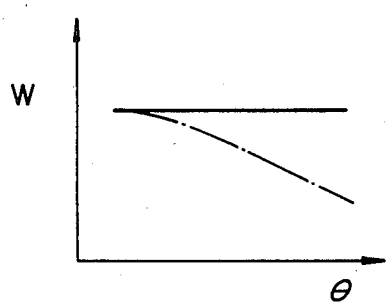

FIG. 4 shows a relationship between the opening anlge $\theta$ and the biasing force P while FIG. 5 illustrates a relationship between the opening angle $\theta$ and the distance W between the pivotal axis A and the point of action. In these graphs, solid lines represent characteristics in the prior art device wherein its biasing spring has the opposite fixed ends. From the solid lines in FIGS. 4 and 5, it is understood that in the prior art device, the biasing force P is linearly increased as the opening angle increases. On the other hand, the distance W between the point of action and the pivotal axis A on the lid member 12 is maintained constant since the opposite ends of the biasing spring are fixed to the stationary parts of the device.

On the contrary, the present invention provides the biasing spring 14 the movable end 14b of which can be moved from its solid-line position to its dotted-line position when the opening angle $\theta$ of the lid member 12 increases, as shown by arrow B in FIGS. 1 and 3. In other words, the movable end 14b of the biasing spring 14 slidably contacts the backface of the lid member 12 such that it slidably moves on the surface of the lid member 12 in the direction of arrow B as the latter is being opened by the insertion of the cartridge 100. As shown in dotted line in FIG. 5, therefore, the distance W from the pivotal axis A on the lid member 12 to the point of action of the biasing spring 14 is gradually decreased as the opening angle $\theta$ of the lid member 12 increases. As a result, the biasing force P of the biasing spring 14 will be maintained substantially constant as shown by dotted line in FIG. 4, irrespective of the increase of the opening angle $\theta$.

In such an arrangement, the biasing force P on the lid member 12 can be maintained substantially at its original state or within a preselected acceptable range even when the opening angle $\theta$ of the lid member 12 is very large.

Figure 6:
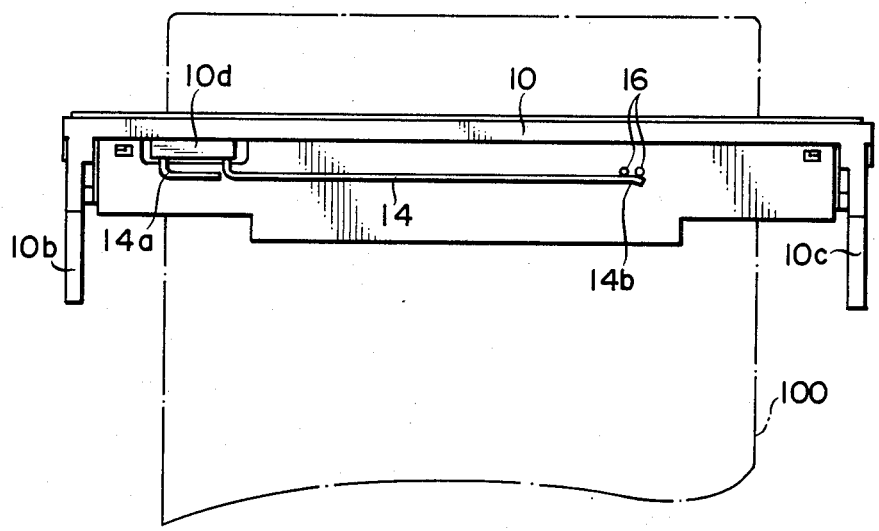
FIG. 6 is a plan view of the closure mechanism in such a condition that its lid member is opened by the cartridge being inserted into the front panel as shown in FIG. 2.

In the illustrated embodiment, furthermore, the lid member 12 is provided with stop pins 16 on the backface thereof. When the lid member 12 is actually completely opened by the insertion of the cartridge 100 as shown in FIG. 6, the movable end 14b of the biasing spring 14 will engage the stop pins 16 to position the biasing spring 14.

Since the biasing force on the lid member is controlably maintained substantially constant or within an acceptable range irrespective of the opening angle of the lid member, the present invention can prevent an excessive pressure from being applied to the lid member from the recording or recorded medium being inserted into the drive device. This efficiently prevents the medium from being damaged.

In accordance with the present invention, the biasing spring can be made of a spring wire as in the illustrated embodiment since any excessive force is not applied to the lid member. Therefore, the closure mechanism can be obtained which is inexpensive, small-sized and excellent in machining and assembling. With the biasing spring made of a spring wire, it can easily be bent at one end into a rectangular configuration which is very useful in being press-fitted into the groove on the receiving element of the lid member.

What is claimed is:

1. A closure mechanism comprising a panel having an opening formed therein, a lid member journalled on said panel for opening and closing said opening and a biasing spring for biasing said lid member toward its closed position, the improvement comprising that said biasing spring is rigidly mounted at one end on said panel with the opposite free end of said biasing spring being resiliently engaged by said lid member under the action of a preselected biasing force to form a point of action, said point of action being slidably moved on the surface of said lid member depending on variations of the opening angle of said lid member, said point of action being thus located at the farthest position from the pivotal axis of said lid member, the distance between the point of action and the pivotal axis of said lid member being decreased as the opening angle of said lid member increases, whereby the biasing force exerted from said biasing spring to said lid member can be maintained substantially constant.

2. A closure mechanism as defined in claim 1 wherein said biasing spring is made of a spring wire and wherein said spring wire is bent at one end into a rectangular configuration, the bent end of said spring wire being press-fitted into receiving means extending from the backface of said panel.

3. A closure mechanism as defined in claim 1 or 2 wherein the backface of said panel is provided with stopper means for positioning the free end of said biasing spring and wherein when said lid member is completely opened by the insertion of a cartridge, the free end of said biasing spring engages said stopper means to position said biasing spring.

4. A closure mechanism as defined in claim 1 wherein said panel is a decorative front panel in a floppy disk drive.

* * * * *